2,916,503

FRIEDEL-CRAFTS REACTION WITH METAL CYCLOPENTADIENYL COMPOUNDS

John Kozikowski, Walled Lake, Mich., assignor to Ethyl Corporation, New York, N.Y., a corporation of Delaware No Drawing. Application October 31, 1956
Serial No. 619,390

9 Claims. (Cl. 260—429)

This invention relates to organometallic compounds and more particularly to a novel and useful method of preparing substituted cyclopentadienyl metal coordination compounds of certain specified type.

In the preparation of organometallic compounds for use as additives to liquid hydrocarbons, the properties of stability, volatility and solubility are of considerable importance. Stability is important because additives having low stabilities often decompose in the presence of water, atmospheric constituents such as oxygen and carbon dioxide and hydrogen sulfide. The importance of thermal stability becomes apparent from the fact that the resulting fuel or lubricant compositions frequently encounter diverse conditions of temperature, such as those prevalent in tropic, temperate and arctic regions as well as seasonal fluctuations in temperature in a specific region. Solubility is of considerable importance in obtaining homogeneous compositions which remain compatible during long periods of storage. The importance of volatility is apparent from a consideration of the fact that volatility has considerable influence on engine inductibility, that is, the character of a fuel composition to readily undergo operations, such as carburetion, manifolding and injection, utilized to introduce or induct such compositions into internal combustion engines.

Organometallic compounds which contain a cyclopentadienyl radical and some other electron donating group coordinated with a metal atom have valuable properties as additives to liquid hydrocarbons. However, in the past it has been difficult to obtain such cyclopentadienyl compounds wherein the cyclopentadienyl group has been highly substituted with various organic groups for the purpose of beneficially altering the characteristics of stability, volatility and solubility. This difficulty is due in part to the problems of synthesizing substituted cyclopentadienyl compounds which are suitable as starting materials and further complicated by the difficulties encountered in preparing the organometallic compound from the substituted cyclopentadiene.

It is, therefore, an object of this invention to provide a process for the preparation of organometallic compounds. A further object is to provide a process for the preparation of organometallic coordination compounds which contian a substituted cyclopentadienyl radical and other groups coordinated with a metal atom.

The above and other objects of this invention are accomplished by providing a process which comprises reacting a compound having the formula $A_xMB_yC_z$ where A is an organic cyclopentadienyl radical having hydrogen bonded to a cyclopentadienyl carbon, M is a transition metal, B and C are electron donating groups different from a cyclopentadienyl radical, $x$ is a small integer from 1 to 2 inclusive, $y$ is a small integer from 1 to 4 inclusive and $z$ is a small whole number from 0 to 2 inclusive such that the metal atom is in the state of maximum covalency; with a Friedel-Crafts addition agent in the presence of a Friedel-Crafts catalyst.

Thus, the process of this invention comprises the preparation of a compound having the formula $A'_xMB_yC_z$ where A' is a substituted cyclopentadienyl radical having as substituents one or more alkyl, aryl, aralkyl, acyl or alkenyl groups M, B, C, $x$, $y$ and $z$ are as defined as above.

M in the above formulae, that is, the metallic constituent of the cyclopentadienyl compounds prepared by the process of this invention comprise elements from groups IVB, VB, VIB, VIIB, VIII, IB and IIB of the periodic table, namely the elements titanium, vanadium, chromium, molybdenum, tungsten, manganese, rhenium, iron, cobalt, nickel, copper and zinc. Thus, the metallic constituent of the novel cyclomatic compounds of this invention is a transition metal of the fourth, fifth or sixth period of the periodic table. Of these, the metals of group VIIB are preferred as excellent yields result when compounds containing these metals are used. Manganese is particularly preferred as the manganese compounds prepared by the process of this invention are superior antiknock agents when added to gasoline.

A in the above formula comprises a cyclopentadienyl type radical which is a radical containing the cyclopentadienyl moiety. In general such cyclomatic hydrocarbon groups can be represented by the formulae:

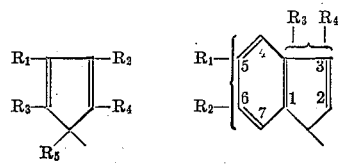

where the R's are selected from the group consisting of hydrogen and univalent organic hydrocarbon radicals. Those cyclopentadienyl radicals having up to about 13 carbon atoms are preferred as it is found that compounds containing those react readily in the process of this invention. The methylcyclopentadienyl radical is particularly preferred as excellent yields of useful products are obtained from compounds containing this radical.

The groups represented by B and C in the above formula are designated as electron donating groups other than a cyclopentadienyl containing radical. Electron donating groups, generally speaking, are entities which are capable of sharing electrons with a metal atom so that the metal atom achieves a rare gas structure by virtue of the added electrons of the electron donating groups and the cyclopentadienyl group. These electron donating groups are either radicals or molecular species which contain labile electrons, which electrons assume more stable configuration in the molecules when associated with a metal to give the metal the configuration of a rare gas in the outer electron shell thereof. Hydrogen, the cyano group, and the isonitrile radical are examples of one electron donor while carbon monoxide, ammonia and primary, secondary, tertiary amines are illustrative of two electron donors. The nitrosyl group is an example of a three electron donor. The carbonyl group, CO, is a preferred constituent of the compounds used in the process of this invention as it has been found that compounds containing this group readily undergo reaction to give high yields of desirable products.

Thus, an embodiment of this invention comprises reacting a group VIIB transition metal coordination compound containing a cyclopentadienyl radical having up to 13 carbon atoms and containing carbonyl groups coordinated to the metal atom with a Friedel-Crafts addition agent in the presence of a Friedel-Crafts catalyst. Another embodiment comprises reacting a cyclopentadienyl manganese tricarbonyl compound with a Friedel-Crafts addition agent in the presence of a Friedel-Crafts catalyst.

A preferred class of compounds preparable by the process of this invention comprises those compounds in which M is manganese. Further, those manganese compounds in which z is equal to O are preferred. This class is preferred because the compounds are liquid hydrocarbon additives of superior quality. A particularly preferred class of compounds having the formula A'Mn(CO)$_3$ as it has been found that these compounds are superior antiknock agents when added to liquid hydrocarbon fuels used in the operation of spark ignition internal combustion engines.

As used herein the term Friedel-Crafts addition agent refers to the reagents which heretofore have been employed in conducting a substitution reaction with an aromatic system. Olefins, highly strained cycloparaffins, polyalkylbenzenes, alkyl halides, alcohols, ethers and esters of organic and inorganic acids, polybasic acid anhydrides and acyl halides serve as examples of Friedel-Crafts addition agents. The lower alkyl halides, aralkyl halides, olefins and acyl halides are preferred in the process of this invention as their use leads to high yields of substituted cyclopentadienyl metal coordination compounds. Further, the term Friedel-Crafts type catalyst refers to those electron acceptors or Lewis acids which are used in conducting substitution reactions on a benzene type nucleus. These include metal salts, metal halides, acids, acid anhydrides and halides of certain metalloids. These catalysts which are liquids, solids or gases are conveniently employed. Examples of these are $AlCl_3$, $AlBr_3$, $FeCl_3$, $SbCl_5$, $BF_3$, $ZnCl_2$, $TiCl_4$, HF, $H_2SO_4$, $H_3PO_4$, $P_2O_5$, $TeCl_2$ and $SnCl_4$. Aluminum halides, and particularly aluminum chloride, are preferred in the practice of this invention as these are readily available and give good yields of product.

Preferred embodiments of this invention comprise reacting a cyclopentadienyl manganese tricarbonyl compound with acyl halide, alkyl halide, aralkyl halide or acyl halide in the presence of a metal salt catalyst which is an electron acceptor. Examples of these are: the reaction between cyclopentadienyl manganese tricarbonyl and benzoyl chloride in the presence of ferric chloride, the reaction between ethylcyclopentadienyl manganese tricarbonyl and 1-hexene in the presence of $AlBr_3$ and the reaction between methylcyclopentadienyl manganese tricarbonyl and acetyl chloride in the presence of $AlCl_3$.

Thus, in accordance with this invention acetyl cyclopentadienyl manganese tricarbonyl is conveniently prepared by the reaction of acetyl chloride and cyclopentadienyl manganese tricarbonyl in the presence of aluminum chloride, ethylcyclopentadienyl manganese tricarbonyl is produced by the reaction of ethyl alcohol and cyclopentadienyl manganese tricarbonyl in the presence of boron trifluoride, the reaction of methylcyclopentadienyl rhenium tricarbonyl and 1-chloropropane in the presence of ferric chloride produces methyl propylcyclopentadienyl rhenium tricarbonyl.

The process of this invention is preferably carried out in a suitable solvent which is inert under the conditions of the reaction. Thus, the solvent should be inert to the addition agent and cyclopentadienyl metal coordination compound. It may, as in the case of nitrobenzene, form a complex with the catalyst. Nitrobenzene, carbon disulfide, petroleum ether, methylene chloride and ethylene chloride are examples of such solvents. Alternatively, a reactant which is liquid at the temperature of the reaction may serve as a carrier for the other reactants. Thus, when hydrogen fluoride is used as a catalyst and the reaction is conducted at below the boiling point of the hydrogen fluoride, it may be used as a carrier for the addition agent and metal cyclopentadienyl compound.

The reaction between the addition agent and the cyclopentadienyl metal coordination compound is conducted at atmospheric pressure and at temperatures ranging from about 0° C. or less, up to the reflux temperature of the solvent used. Ordinarily the reaction takes place at room temperatures or below but temperatures as high as 100° C. are employed.

The reactants are preferably mixed at a temperature below the temperature at which reaction takes place and the mixture is then allowed to rise to the reaction temperature with continuous agitation. Reaction times from less than one hour to 24 hours or more are employed.

When the reaction is completed, the product may be separated from the reaction mixture by various methods. Thus, when a metal salt is used as a catalyst, it is desirable to decompose the complex thus formed by the treatment with ice and water. In this case it is often desirable to add an acid such as hydrochloric acid in order to avoid precipitation of metal hydroxides. When a catalyst such as hydrogen fluoride which is a gas at room temperature is used, the catalyst may be removed by evaporation by simply allowing the reaction mixture to attain room temperature and so remain until all the solvent is volatilized. When a solvent such as carbon disulfide is used, it may be removed from the product by evaporation at elevated temperature after decomposition of the catalyst and removal of the aqueous phase. The product may then be separated and purified by fractional crystallization, sublimation or distillation.

The following examples, in which all parts are by weight, are illustrative of the present invention:

*Example I*

To 10.9 parts of methylcyclopentadienyl manganese tricarbonyl in 63 parts of carbon disulfide was added in one portion 7.5 parts of anhydrous aluminum chloride. This mixture was stirred in a nitrogen atmosphere, in the absence of light and cooled to 0° while a solution of 7.05 parts of benzoyl chloride in 63 parts of carbon disulfide was added dropwise. When all of the benzoyl chloride solution had been added, the resulting mixture was allowed to warm to 25° C. and the reaction proceeded sluggishly with the evolution of hydrogen chloride for more than three hours. Stirring was continued throughout this period.

When gas evolution had slowed to negligible amounts, the mixture was cooled to 0° C. and ice was added to decompose the aluminum chloride and unreacted benzoyl chloride. Extraction with ether followed by washing first with cold dilute hydrochloric acid then with water, followed by drying with anhydrous sodium carbonate gave a clear orange to brown solution. The low boiling solvents were removed by distillation under reduced pressure leaving a dark oily residue which contained some solids. These were separated by recrystallization from petroleum ether (B.P. 66–75°) followed by sublimation at 90° C. and 1 mm.

Two parts of the yellow crystalline solid thus obtained represented 12.4 percent of the theoretical yield. This benzoyl methylcyclopentadienyl manganese tricarbonyl has a melting point of from 115 to 119° C. and gave on analysis 59.7 percent carbon, 3.14 percent hydrogen, 17.1 percent manganese. These figures agree exactly with a calculated analysis for $C_{16}H_{11}MnO_4$. The material gave a positive test of carbonyl groups when tested with 2,4-dinitrophenylhydrazine reagent.

*Example II*

The procedure of Example I was repeated using 3.9 parts of acetyl chloride in place of the benzoyl chloride. The reaction mixture was refluxed for two hours after the acetyl chloride addition was complete. Fractional distillation of the washed ether extract through helix packed column gave an orange liquid which boils at 160° C. at 17 mm. and represents a 76.4 percent yield of acetyl methylcyclopentadienyl manganese tricarbonyl. Analysis of the compound shows a carbon content of 50.7 percent and a hydrogen content of 3.48 percent. This corresponds very well to a calculated analysis of 50.8 percent carbon and 3.46 percent hydrogen. Acetyl methylcyclopentadienyl manganese carbonyl gives an immediate positive test for carbonyl groups with 2,4-dinitrophenylhydrazine. The infrared curve confirms the presence of a ketonic carbonyl group.

Example III

The procedure of Example I was repeated using 34.3 parts of tertiary butyl bromide, 5 parts of $AlCl_3$ and 54.5 parts of methylcyclopentadienyl manganese tricarbonyl in 314 parts of carbon disulfide. The reaction was carried out at room temperatures for a 14 hour period with constant agitation. The reaction mixture was then cooled to 5° C. and ice was added. The organic layer was separated and washed using small amounts of methanol to break the emulsions which formed. 71.3 parts of ether were added and the solution was dried over anhydrous sodium carbonate. The dried solution was filtered, the solvents were removed and the residue was distilled through a helix packed column. Tertiary butyl methylcyclopentadienyl manganese tricarbonyl was collected at 118 to 120.5° C. at 9 mm. The yield was 58.5 percent of the theoretical. When analyzed, the compound was found to contain 57.0 percent carbonyl, 5.50 percent hydrogen and 20.9 percent manganese. This compares very well with the calculated content for $C_{13}H_{15}MnO_3$.

Example IV

The procedure of Example III was repeated using 30.75 parts of isopropyl bromide, 5 parts $AlCl_3$, 54.5 parts methylcyclopentadienyl manganese tricarbonyl and a total of 315 parts of carbon disulfide. The reaction was conducted at the reflux temperature of carbon disulfide for one hour. Isopropyl methylcyclopentadienyl manganese tricarbonyl was recovered in 16.29 percent yield as a liquid boiling at 128 to 129° C. at 15 mm.

Example V

Isobutylene (20 parts) was bubbled slowly into a stirred slurry of 5 parts of anhydrous aluminum chloride in a solution of 54.5 parts of methylcyclopentadienyl manganese tricarbonyl in 315 parts of carbon disulfide. The system was under a nitrogen atmosphere and the temperature maintained at 5° C. until all but 6 parts of the isobutylene had been added. The temperature was allowed to rise during the latter part of the addition and the only evidence of reaction was a very slight heat evolution which took the temperature slightly above that of the room.

The isolation procedure was the same as that outlined above for the alkylation via tert-butyl bromide. A single distillation at 10 millimeters through a helix-packed column gave a fractional boiling at 124–129° C. which was identified as tertbutylmethylcyclopentadienyl manganese tricarbonyl.

The highest boiling fraction (149–165° C. at 5 millimeters) analyzed for a material having more than two tert-butyl groups. Thus, it appears that mono-, di- and tri-substitution took place. This behavior on the part of methylcyclopentadienyl manganese tricarbonyl is in marked contrast to that of ferrocene (dicyclopentadienyl iron) as it has been reported that ferrocene will not condense with olefins in the presence of hydrofluoric acid which is a stronger catalyst than aluminum trichloride in the reactions of olefins.

Example VI

The procedure of Example I is repeated except that 9 parts of cyclopentadienyl cobalt dicarbonyl, $$C_5H_5Co(CO)_2$$

are used in lieu of the methylcyclopentadienyl manganese tricarbonyl. A good yield of benzoyl cyclopentadienyl cobalt dicarbonyl results.

Example VII

Propylcyclopentadienyl iron carbonyl cyanide, $$C_3H_7C_5H_4Fe(CO)_2(CN)$$

is prepared by the reaction of propyl alcohol and cyclopentadienyl iron dicarbonyl cyanide using hydrogen fluoride as a carrier and catalyst in the following manner: To a stainless steel reaction vessel equipped with a stainless steel cover having stirring means, means for attaching a temperature measuring device and means for admitting reagents, is added 300 parts of liquid hydrogen fluoride while the vessel is maintained at 0° C. in an exhaust hood. Thirty parts of cyclopentadienyl iron carbonyl cyanide and 10 parts of propyl alcohol are admitted to the vessel in incremental quantities during a three hour period while the contents of the vessel are constantly under agitation and maintained below 5° C. When the reagent addition is complete, the reaction mixture is allowed to rise in temperature slowly over a period of 10 hours until the mixture attains the boiling temperature of hydrogen fluoride. The mixture is maintained at this temperature for 24 hours after which time the residue is poured into excess of ice and the organic layer which results is separated from the aqueous phase. Propylcyclopentadienyl iron carbonyl cyanide is separated in good yield from the organic phase.

The technique employed in the above example is also applicable to the reaction between cyclopentadienyl metal coordination compounds and unsaturated hydrocarbons. Thus, propylcyclopentadienyl nickel nitrosyl is prepared by the reaction of cyclopentadienyl nickel nitrosyl and propylene using hydrogen fluoride both as carrier are catalysts by maintaining a positive pressure of propylene above the reagent solution or by passing propylene through the solution. In a similar manner, butylcyclopentadienyl vanadium tetracarbonyl is prepared by the reaction of butene and cyclopentadienyl vanadium tetracarbonyl.

Example VIII

Cyclopentadienyl rhenium tricarbonyl (335 parts) and 85 parts of cyclohexene are kept under agitation in a glass reaction vessel. Boron trifluoride is passed through the mixture at room temperature for 30 minutes after which time the excess cyclohexene is removed by distillation and cyclohexylcyclopentadienyl rhenium tricarbonyl is recovered by crystallization.

In a similar manner cyclopentadienyl chromium tricarbonyl hydride is reacted with propyl alcohol to form a propylcyclopentadienyl chromium tricarbonyl hydride under the influence of boron trifluoride.

Example IX

Example I is repeated using ferric chloride $FeCl_3$ and ethyl ether in place of the aluminum chloride and benzoyl chloride. A good yield of ethylmethylcyclopentadienyl manganese tricarbonyl is produced.

The above examples are merely illustrative of the process of this invention. Other examples of the compounds which are prepared by this process are propylcyclopentadienyl titanium tricarbonyl nitrosyl $$(C_3H_7C_5H_4)Ti(CO)_3NO$$

prepared by the reaction of cyclopentadienyl titanium tricarbonyl nitrosyl with cyclopropane using 96 percent sulfuric acid as a catalyst; ethylpropylcyclopentadienyl vanadium dinitrosyl carbonyl prepared by the reaction of propylcyclopentadienyl vanadium dinitrosyl carbonyl and ethyl sulfate using aluminum chloride as a catalyst; ethylcyclopentadienyl tungsten tricarbonyl hydride prepared by the reaction of cyclopentadienyl tungsten tricarbonyl hydride with ethyl formate in the presence of zinc chloride; tert-butylcyclopentadienyl manganese dinitrosyl prepared by the reaction of cyclopentadienyl manganese dinitrosyl with isobutylene using phosphorus pentoxide as a catalyst;

octylcyclopentadienyl rhenium tricarbonyl prepared by the reaction of cyclopentadienyl rhenium tricarbonyl and 1-chlorooctane using titanium tetrachloride as a catalyst; di(benzylcyclopentadienyl)rhenium hydride prepared by the reaction of dicyclopentadienyl rhenium hydride and benzylmethyl ether in the presence of tin tetrachloride; 2-phenylethylcyclopentadienyl iron dicarbonyl hydride prepared by the reaction of cyclopentadienyl iron dicarbonyl hydride with styrene in the presence of aluminum chloride; decylindenyl cobalt carbonyl dihydride prepared by the reaction of cyclopentadienyl cobalt carbonyl dihydride with 1-decene in the presence of concentrated sulfuric acid 5-cyclopentadienyl-5-one-pentanoic acid nickel nitrosyl prepared by the reaction of cyclopentadienyl nickel nitrosyl and glutaric anhydride in the presence of aluminum chloride.

As indicated in the above examples, the reagents which are used in preparing the substituted cyclopentadienyl metal coordination compounds by the process of this invention include olefins, highly strained cycloparaffins, alkyl halides, aralkyl halides, alcohols, ethers, esters, polybasic acid anhydrides and acyl halides. Examples of these are cyclopropane, n-pentyl bromide, p-ethylbenzyl chloride, tert-butyl alcohol, hexyl ethyl ether, butylacetate, succinic anhydride, acetyl chloride, and the like. Of these the alkyl halides, aralkyl halides, acyl halides and olefins are preferred as these compounds react most readily with the cyclopentadienyl metal compound. Further, those reagents are preferred which produce substituted cyclopentadienyl metal coordinated compounds which have up to about 13 carbon atoms in the cyclopentadienyl portion in the molecules.

The amount of catalysts necessary in the process of this invention varies from considerably less than a stoichiometric amount to a large excess. When a metal salt such as aluminum chloride is used as a catalyst, it is seldom necessary to employ more than one mole of catalyst per mole of addition agent, except when the addition contains acyl, keto or aldehyde groups. Ordinarily, any amount equivalent to as little as 0.05 mole of catalyst per mole of addition agent is sufficient, however, at least 0.1 mole is preferred. When a liquid catalyst is employed which is also used as carrier and solvent, a large excess is beneficially used.

The cyclopentadienyl metal coordination compounds used as starting materials in the process of this invention are compounds which contain a cyclopentadiene-type radical bonded to a metal atom through coordinate covalent bonds between the carbon atoms of the cyclopentadiene ring. In addition these compounds contain various electron donating groups as defined above which donate sufficient electrons so that the metal atom attains the configuration of the next heavier rare gas in its outer shell. Thus, for example, the manganese in the compound cyclopentadienyl manganese tricarbonyl has a total of 36 electrons in its outer shell, 25 from the manganese itself, 5 donated by the cyclopentadienyl radical and 2 each, for a total of 6, donated by the carbonyl groups.

These cyclopentadienyl metal coordination compounds used as starting material in the process of this invention are themselves subject to preparation by a variety of methods known in the art. For example, cyclopentadienyl manganese tricarbonyl is conveniently prepared by the reaction of cyclopentadienyl sodium, manganous chloride and carbon monoxide under pressure in a suitable solvent. Cyclopentadienyl cobalt dicarbonyl is prepared by the reaction between dicobalt octacarbonyl and cyclopentadiene at room temperature. Cyclopentadienyl vanadium tetracarbonyl is conveniently prepared by the reaction of cyclopentadienyl magnesium bromide, vanadium tetrachloride and carbon monoxide under pressure. Cyclopentadienyl nickel nitrosyl is prepared by the reaction of bis-cyclopentadienyl nickel with nitric oxide. The preparation of other compounds used as starting materials used in the process of this invention will be apparent to those skilled in the art.

The compounds prepared by the process of this invention are employed with hydrocarbon fuels and lubricating oils for improving operating characteristics of reciprocating, spark fired, or compression ignition engines. The compounds are used in hydrocarbon fuels and lubricating oils by themselves or together with other additives components, such as scavengers, deposit modifying agents containing phosphorus and/or boron, and also ether antiknock agents, such as tetraethyllead, etc.

The term "hydrocarbon fuel" pertains to liquid hydrocarbons and is inclusive of mixtures of aliphatic, olefinic, aromatic and naphthenic hydrocarbons derived from mineral sources such as petroleum, coal, shale and tar sands, and which includes straight run, reformed, cracked and alkylated stocks, and mixtures of these. These fuels are ordinarily referred to as gasoline when the initial boiling point is in the range of about 70 to about 90° F. and the final boiling point is in the range of from less than 300 to above 440° F. Further, gasoline is the term applied to fuels which find primary utility in the operation of spark ignition internal combustion engines.

The compounds prepared by the process of this invention are conveniently added directly to hydrocarbon fuels and the mixture is subjected to stirring, mixing, or other means of agitation until a homogeneous fluid results. Alternatively, the compounds may be first made up into concentrated fluids containing solvents, such as kerosene, toluene, hexane, and the like, as well as ether additives such as scavengers, antioxidants and other antiknock agents, e.g., tetraethyllead. The concentrated fluids can then be added to the fuels.

In order to illustrate some of the advantages of employing the compounds prepared by the process of this invention as antiknock agents in fuels, tests were conducted in which a single-cylinder CFR knock test engine was operated on fuels containing varying amounts of a compound prepared by the process of this invention. The test method employed was that described in test procedure D–908–51 contained in the 1952 edition of "ASTM Manual of Engine Test Methods" for rating fuels.

The test fuel used was a mixture of gasoline hydrocarbons. Acetylmethylcyclopentadienyl manganese tricarbonyl was added to separate portions of the fuel in amounts sufficient to give concentrations of 0.50 and 1.98 grams of manganese per gallon of fuel.

The fuel with no antiknock additive gave an octane rating of 77.2; when the fuel contained 0.50 gram of manganese as acetylmethylcyclopentadienyl manganese tricarbonyl, the rating increased to an octane number of 84.9. When the manganese level was increased to 1.98 grams, the octane rating was 91.8. The same fuel requires 4.75 grams of lead per gallon as tetraethyllead to give the same increase in antiknock effect. Equally good results are obtained when benzoylmethylcyclopentadienyl manganese tricarbonyl is tested in the above and other fuels. Further, excellent results are obtained when manganese compounds prepared by the process of this invention are used, either alone or in conjunction with other additives as pointed out above.

I claim:

1. A process which comprises reacting a compound having the formula $A_xMB_yC_z$ where A is a hydrocarbon cyclopentadienyl radical having hydrogen bonded to a cyclopentadienyl carbon, M is a transition metal selected from the class consisting of the metals of groups IVB, VB, VIB, VIIB, VIII, IB and IIB of the periodic table, B and C are electron donating groups different from a cyclopentadienyl radical and selected from the group consisting of hydrogen, the cyano group, the isonitrile radical, carbon monoxide, ammonia, a primary amine, a secondary amine, a tertiary amine and nitrosyl group, $x$ is a small integer from 1–2 inclusive, $y$ is a small integer from 1–4 inclusive and $z$ is a small whole number from 0–2 inclusive such that the metal atom is in a state of maximum covalency, with a Friedel-Crafts addition agent in the presence of a Friedel-Crafts catalyst.

2. A process which comprises reacting a compound having the formula $AMn(CO)_3$ where A is a hydrocarbon cyclopentadienyl radical having hydrogen bonded to a cyclopentadienyl carbon; with a Friedel-Crafts addition agent in the presence of a Friedel-Crafts catalyst.

3. The process of claim 2 in which said Friedel-Crafts addition agent is selected from the group consisting of alkyl halides, acyl halides and olefins.

4. The process which comprises reacting methylcyclopentadienyl manganese tricarbonyl with acetyl chloride in the presence of aluminum chloride.

5. Process which comprises reacting the compound having the formula:

$$AMn(CO)_3$$

where A is a hydrocarbon cyclopentadienyl radical having hydrogen bonded to a cyclopentadienyl carbon; with a Friedel-Crafts alkylation agent in the presence of a Friedel-Crafts catalyst.

6. The process of claim 5 wherein said compound having the formula $AMn(CO)_3$ is a cyclopentadienyl manganese tricarbonyl.

7. The process of claim 5 wherein said compound having the formula $AMn(CO)_3$ is a methylcyclopentadienyl manganese tricarbonyl.

8. The process of claim 5 wherein said Friedel-Crafts addition agent is an alkyl halide.

9. Process of claim 5 wherein said Friedel-Crafts addition agent is an olefin.

References Cited in the file of this patent

UNITED STATES PATENTS 2,818,416    Brown et al. _____ Dec. 31, 1957

OTHER REFERENCES

Woodward et al.: "J.A.C.S." 74, 3458–3459 (1952).
Fisher et al.: "Zeit. Naturforsch." 9b, page 618 (1954).